United States Patent [19]

Ryoshi et al.

[11] Patent Number: 5,575,871

[45] Date of Patent: Nov. 19, 1996

[54] HEAT INSULATING MATERIAL AND METHOD FOR PRODUCING SAME

[75] Inventors: Hiroto Ryoshi, Toyono-gun; Masanori Okamura, Amagasaki, both of Japan

[73] Assignee: Takeda Chemical Industries, Ltd., Osaka, Japan

[21] Appl. No.: 277,021

[22] Filed: Jul. 19, 1994

[30] Foreign Application Priority Data

Jul. 19, 1993 [JP] Japan .................................. 5-200284
Aug. 16, 1993 [JP] Japan .................................. 5-223850

[51] Int. Cl.$^6$ .............................. B32B 31/04; B32B 3/00
[52] U.S. Cl. .......................... 156/78; 156/213; 156/214; 264/321; 521/174
[58] Field of Search ........................... 156/78, 79, 285, 156/213, 214; 264/321; 521/174

[56] References Cited

U.S. PATENT DOCUMENTS

| | | | |
|---|---|---|---|
| 3,159,700 | 12/1964 | Nakamura | 264/321 |
| 3,946,039 | 3/1976 | Walz | 264/332 |
| 4,053,341 | 10/1977 | Kleiner et al. | 156/79 |
| 4,510,268 | 4/1985 | Tonokawa et al. | 264/321 |
| 4,668,555 | 5/1987 | Uekado et al. | 156/79 |
| 5,312,848 | 5/1994 | Klapper et al. | 521/172 |
| 5,318,997 | 6/1994 | Okada et al. | 521/174 |

*Primary Examiner*—Michele K. Yoder
*Attorney, Agent, or Firm*—Wenderoth, Lind & Ponack

[57] ABSTRACT

The heat insulator of this invention comprises a thermoformed open cell rigid polyurethane foam core enclosed in a gas barrier material and evacuated. The method of this invention comprises heating an open cell rigid polyurethane foam at a temperature not lower than the temperature at which its storage modulus of elasticity begins to decrease and enclosing the thus-thermoformed polyurethane foam in a gas barrier material and evacuating the interior of the enclosure. The heat insulator of the invention is highly heat-insulating and can be snugly applied to irregular surfaces.

9 Claims, No Drawings

HEAT INSULATING MATERIAL AND METHOD FOR PRODUCING SAME

FIELD OF THE INVENTION

This invention relates to a heat insulating material having an open cell rigid polyurethane foam core and a method for producing the same. The heat insulating material according to this invention finds application as an insulating material for freezers, refrigerators, etc. or an insulation material for feed water heaters, pipeline claddings and so on.

BACKGROUND OF THE INVENTION

Rigid polyurethane foam in general is a closed cell structure entrapping a gas such as a halogenated hydrocarbon or a chlorofluorocarbon, e.g. trichlorofluoromethane (hereinafter referred to briefly as R-11), or carbon dioxide. Since such gases are of low thermal conductivity, the closed cell polyurethane foam has an excellent heat insulating property. Moreover, rigid polyurethane foam has good formability in addition, so that it has been used as heat insulators and structural members in a broad field.

However, the conventional chlorofluorocarbons represented by R-11 are chemically so stable that they diffuse undecomposed into the stratosphere to destroy the ozone layer, thus presenting a serious threat to the earth ecology. For this reason, the use of chlorofluorocarbons has been increasingly restricted in recent years, with a complete ban being foreseen in the near future. Therefore, a great deal of research is being undertaken for developing blowing agents that may substitute chlorofluorocarbons. So far, 1,1-dichloro-1-fluoroethane (hereinafter referred to briefly as HCFC-141b) and methylene chloride, among others, have been proposed as possible substitutes for R-11.

However, the thermal conductivity of a closed cell rigid polyurethane foam depends on the thermal conductivity of the blowing gas employed. Therefore, a heat insulating material of low thermal conductivity can hardly be obtained using a substitute so far proposed, such as HCFC-141b which is definitely greater in thermal conductivity than R-11. Furthermore, any closed cell rigid polyurethane foam suffers significant dimensional changes, deformations and curling in a widely fluctuating temperature environment and is, therefore, limited in the scope of application.

In view of the above situation, a heat insulating material, called "evacuated heat insulator", which comprises a foam core encased in a gas barrier material, evacuated and sealed gas-tight has been proposed. The core heretofore known for such a heat insulating material includes inorganic substances, such as perlite, typically in a powdery form or in a honeycomb form. However, any heat insulating material utilizing an inorganic core material such as perlite is not only poor in manufacturing workability but also of high density and costly.

Heat insulating materials utilizing a core of organic materials, such as an open cell rigid poly urethane foam, have also been proposed (JP Kokai S-57-133870, JP Publication H- 1-4112). Such an insulating material is generally manufactured by covering an open cell rigid polyurethane foam core with a gas barrier casing material, evacuating the internal cells and sealing the structure. However, the cell size such core is 300–1000 μm and in order to insure a sufficient heat insulating performance, it takes a long evacuation time to reduce the internal pressure to the order of 0.001 mmHg. This is a considerable productivity drawback and, therefore, the technology is not suited for mass production. Furthermore, when such a core of polyurethane foam is employed, the insulating material cannot be tailored to the irregular wall surface of an electric refrigerator, for instance, but can be applied only to flat surfaces.

OBJECT AND SUMMARY OF THE INVENTION

The object of this invention is to provide a heat insulating material utilizing a core of open cell rigid polyurethane foam, which has an excellent heat insulating property and can be snugly applied to any irregular surface.

The inventors of this invention found after a great deal of research that when an open cell rigid polyurethane foam is thermoformed to the desired shape under herein-specified conditions, evacuated and sealed, the above-mentioned object can be neatly accomplished. This finding was followed by further research which has brought this invention into being.

This invention thus provides a heat insulating material which comprises a package of a gas barrier material and a core of a thermoformed open cell rigid polyurethane foam enclosed therein under vacuum. In another aspect, this invention provides a method for producing a heat insulating material which comprises thermoforming an open cell rigid polyurethane foam, enclosing the foam in a gas barrier material, and evacuating the interior of the enclosure to substantial vacuum.

DETAILED DESCRIPTION OF THE INVENTION

The heat insulating material of this invention comprises a core of open cell rigid polyurethane foam. The blowing agent for use in the production of such an Open cell rigid polyurethane foam is preferably at least one member selected from the group consisting of water, which is a chemical blowing agent, and halogenated hydrocarbons and hydrocarbons, which are physical blowing agents.

However, it is more preferable that water should be used as the substantially sole blowing agent. The halogenated hydrocarbon that can be used has 1–5 carbon atoms and at least one halogen atom (chlorine, fluorine and so on) which is substituted for hydrogen. Examples of the halogenated hydrocarbons are chlorofluorocarbons such as CFC-11, hydrochlorocarbons such as chloroform, hydrochlorofluorocarbons such as HCFC-22, HCFC-123 and HCFC-141 b, and perfluorocarbons such as perfluoropentane, perfluorohexane, and so on.

The hydrocarbon that can be used is a chain hydrocarbon or a cyclic hydrocarbon having 5–6 carbon atoms. The hydrocarbons are n-pentane, isopentane, cyclopentane, n-hexane, isohexane, cyclohexane and so on.

Where the blowing agent is water, its proportion based on 100 parts by weight of the polyol is 0.5–12 parts by weight, preferably 1–10 parts by weight. The proportion of said halogenated hydrocarbon or hydrocarbon based on 100 parts by weight of the polyol is 3–150 parts by weight, preferably 5–120 parts by weight. If the proportion of the blowing agent is below the above range, the desired low-density foam cannot be obtained. On the other hand, if the blowing agent is used in an amount exceeding the above range, the resultant foam may not have a sufficient strength.

The open cell rigid polyurethane foam for use as the core of the heat insulating material according to this invention can be produced by reacting a polyol with an organic polyisocyanate or a prepolymer thereof in the presence of said blowing agent, a catalyst and a foam stabilizer.

The polyol that can be used includes polyether polyols, polyester polyols and reactive methylol group-containing phenolic resins, which are conventionally used in the production of ordinary rigid polyurethane foams.

The polyether polyol includes a polyoxyalkylene polyol which is obtained by using an active hydrogen-containing compound having an average functionality of 2–8 and a hydroxyl value of 300–600 mgKOH/g, as an initiator. Examples of active hydrogen-containing compounds include polyhydric alcohols, polyamines and so on.

The polyhydric alcohols include dihydric alcohols such as propylene glycol, dipropylene glycol; trihydric alcohols such as glycerol, trimethyrolpropane; polyhydric alcohols being over trihydric alcohol such as pentaerythritol, diglycerol, methylglucoside, sorbitol, saccharose.

The polyamine that can be used is an organic compound having at least two active hydrogens from an amino group and at least one active hydrogen from a hydroxyl group, or at least three active hydrogens from an amino group. Examples of polyamines include (poly) alkylenepolyamines, alkanolamines and aromatic polyamines. Examples of (poly) alkylenepolyamines include ethylene diamine, diethylene triamine. Examples of alkanolamines include monoethanolamine, diethanolamine, triethanolamine, isopropanolamine. Examples of aromatic polyamines include tolylenediamines (2,4/2,6-tolylenediamine and 2,3/3,4-tolylenediamine and so on), diaminodiphenylmethanes, polymethylene polyphenyl polyamines. Other organic polyamines that can be used include aliphatic amines such as aminoethyl-piperazine hexamethylenediamine. Organic polyamines particularly preferred are ethylene diamine and tolylenediamines.

These polyether polyols may be the following mixture of polyols (a), (b) and (c).

The polyester polyols include polyester polyols which can be obtained by polycondensation of polyhydric alcohol having an average functionality of 2–4 and a hydroxyl value of 250–500 mgKOH/g, and polybasic acid. The polyhydric alcohols include ethylene glycol, diethylene glycol, 1,4-butanediol, trimethyrolpropane, pentaerythritol. The polybasic acids include adipic acid, succinic acid, azelaic acid, sebacic acid, maleic anhydride, phthalic anhydride.

Particularly when the foam is to be produced with a blowing system predominantly composed of water, it is preferable to employ the following mixture of polyols (a), (b) and (c).

A polyol mixture having a hydroxy value of 160–500 mg/KOH/g which consists of
(a) 10–60 weight % of a polyoxyalkylene polyol having an average functionality of 2–3.5, a hydroxyl value of 26–90 mgKOH/g and a polyoxyethylene content of not more than 5 weight %, with terminal primary hydroxyl groups accounting for not more than 15% of all hydroxyl groups,
(b) 20–80 weight % of a polyoxyalkylene polyol having an average functionality of 3–6, a hydroxyl value of 150–600 mgKOH/g and a polyoxyethylene content of not more than 5 weight %, with terminal primary hydroxyl groups accounting for not more than 15% of all hydroxyl groups, and
(c) 0–25 weight % of a polyoxyalkylene polyol having an average functionality of 2–3 and a hydroxyl value of over 600 mgKOH/g to 840 mgKOH/g.

When any of the above-mentioned conventional polyols for rigid polyurethane foam is used in the production of open cell rigid polyurethane foam, it is preferable to employ a physical blowing agent, such as a halogenated hydrocarbon or a hydrocarbon, e.g. pentane, in combination with water, but the physical blowing agent such as a halogenated hydrocarbon or a hydrocarbon can be used as the sole blowing agent.

On the other hand, when the above-mentioned polyol mixture [(a), (b) and (c)] is employed, the reaction is preferably conducted using water as the sole blowing agent. However, if necessary, a low-boiling liquid such as said halogenated hydrocarbon and pentane can be used in combination with water.

The foam stabilizer is preferably an organic polysiloxane copolymer which is generally recommended for flexible slabstock foams, hot moldings or rigid foams. Among examples of such cell size regulator are B-8404 and B-8017 from Gold-Schmidt, L-5410, SZ-1127 and L-582 from Nippon Unicar Co., Ltd., SH-190, SH-192 and SH-193 from Toray Dow Corning Co., Ltd., and F-345, F-341, and F-242T from Shin-Etsu Chemical Co., Ltd. The amount of the foam stabilizer is generally 0.5–3 parts by weight based on 100 parts by weight of the polyol.

As the catalyst, the well-known amine, tin and lead series catalysts, alkali metal carboxylates, strongly basic metal salt catalysts such as calcium hydroxide and other isocyanuration catalysts, among others can be used. Generally speaking, amine catalysts and particularly tertiary amines are preferred. Among such tertiary amines are tetramethylhexamethylenediamine (TMHDA), pentamethyldiethylenetriamine (PMDETA) and so on. These catalysts can be used alone or in combination.

The polyisocyanate is preferably polymethylene polyphenylene polyisocyanate (crude MDI, also known as polymeric MDI), its prepolymer and a combination thereof. The prepolymer of polymethylenepolyphenylene polyisocyanate can be obtained by reacting polymethylene polyphenylene polyisocyanate with a hydroxyl group-containing compound or the like and preferably has an amine equivalent of 140–200. The hydroxyl group-containing compounds include monoalcohols such as methanol, ethanol, n-butanol, ethylene glycol monomethyl ether, diethylene glycol monomethyl ether; phenols such as phenol and o-,m-,p-cresol; diols such as ethylene glycol, diethylene glycol, propylene glycol, 1,4- butanediol, 1,6-hexane glycol; triols such as glycerol, trimethylolpropane; and polyetherpolyols and polyesterpolyols having a functionality of 2–3. If necessary, MDI and/or its prepolymer can be used in combination with other polyisocyanates and prepolymers thereof, such as tolylene diisocyanate and its prepolymer, xylylene diisocyanate (XDI), dicyclohexylmethane diisocyanate (HMDI), tetramethylxylene diisocyanate (TMXDI), isophorone diisocyanate (IPDI), hexamethylene diisocyanate (HDI), trimethylhexamethylene diisocyanate (TMHDI) and so on.

Where said polyol for rigid polyurethane foam is used as the polyol component in the production of an open cell rigid polyurethane foam according to this invention, it is necessary to add a cell opening (interconnecting) agent such as an alkali metal or zinc salt of a saturated higher fatty acid or a thermoplastic resin powder.

The alkali metal or zinc salt of saturated higher fatty acid includes calcium stearate, magnesium stearate, strontium stearate, zinc stearate, calcium myristate and so on. The thermoplastic resin powder may for example be a powder of polyethylene. Such a cell opening agent is used in a proportion of generally 0.1–50 weight % and preferably 0.1–20 weight parts based on the polyol.

In the practice of this invention, a flame retardant additive, antioxidant, colorant and other additives can be used as required. The preferred flame retardant additive is trischloropropyl phosphate (TCPP).

The open cell rigid polyurethane foam for use as the core of the heat insulator of this invention can be produced by the per se known technology. The product foam may be a slabstock foam or a molded foam. The slabstock foam is generally preferred. For example, the reactants described above are uniformly admixed and reaction is carried out using a highpressure foaming machine.

The resultant open cell rigid polyurethane foam is then thermoformed to render at least some of the air cells anisotropic and enclosed in a gas barrier material or a vessel made of such material and the interior of the enclosure is sealed gas-tight under reduced pressure, i.e. at about 0.1–0.01 mmHg which is industrially easy to attain.

Regarding the density of the open cell rigid polyurethane foam to be used, the foam available on free blowing is preferably in the density range of 15–150 kg/m$^3$. If the density is less than 15 kg/m$^3$, sufficient strength cannot be expected. On the other hand, if the upper limit of 150 kg/m$^3$ is exceeded, the merit of selecting an open cell structure will be virtually nullified. As far as the foam for use as the core of a heat insulator is concerned, cost considerations suggest that the foam density should be preferably within the range of 15–150 kg/m$^3$.

The thermoforming process according to this invention comprises heating an open cell rigid polyurethane foam and applying a positive pressure to the softened foam so as to produce anisotropy in cell dimension or subjecting the foam to a negative pressure in conformity with the cavity of a mold while the foam is still soft. The preferred degree of thus-produced anisotropy (aspect ratio:major diameter/minor diameter) is 3–5. As such an anisotropy is introduced to the cells, the resistance to heat conduction of the conduction path constituted by the polyurethane itself is increased to enhance the heat insulating property of the product insulator. Then, the foam ejected from the mold is dried to remove the adsorbed water and unreacted material and, then, enclosed in a gas barrier material. The enclosure is then subjected to a negative pressure and finally sealed hermetically in that condition to provide a thermoformed heat insulator true to size.

The heating temperature for softening the rigid polyurethane foam is not below the temperature where the storage modulus of the foam begins to decrease and not over 250° C. Preferably, the heating temperature is not below the glass transition temperature of the foam and not over 250° C. When a rigid polyurethane foam is heated to a temperature over 250° C., a thermal degradation of the rigid polyurethane foam occurs to sacrifice the physical properties required of a heat insulator core.

The gas barrier material for use in accordance with this invention is preferably a flexible material which can be snugly fit to the thermoformed open cell rigid polyurethane foam. A variety of packaging materials having a gas barrier property can be employed and heat-sealable laminate films are particularly advantageous. Such films may be composite films each made up of two or more layers of gas barrier material and thermoplastic resin material.

The film which can be used as the gas barrier layer includes various films each having an aluminum-metalizing layer or a solid metal layer such as aluminum foil, a vinylidene chloride-coated film and an ethylene-vinyl alcohol copolymer film (Eval, Kuraray; Sowanol, The Nippon Synthetic Chemical Industry Co., Ltd.), among others.

The thermoplastic film which can be used for lamination includes polyethylene film, polypropylene film and ethylene-vinyl alcohol copolymer film (Eval, Kuraray; Sowanol, The Nippon Synthetic Chemical Industry Co., Ltd.).

The laminate film structure may for example be aluminum-metalizing polyester film/polyethylene film, polyester film/aluminum foil/polypropylene film, or vinylidene chloride-coated polyester film/polyethylene film. Preferred is the aluminium-metalizing polyester film/polyethylene film combination. The heat insulator thus obtained can be further heat-tailored so as to be suited or complementary to the application site.

By the method of this invention, the open cell rigid polyurethane foam core can be thermoformed under conditions producing monoaxial deformation, then enclosed in a gas-barrier material and sealed gas-tight under an industrially achievable negative pressure of about 0.1–0.01 mmHg to provide a heat insulator which can be attached even to an irregular surface to insure excellent thermal insulation. The heat insulator thus obtained is of low thermal conductivity and, as aforesaid, can fit itself to an irregular installation surface. Therefore, it can be used with great advantage as a cold insulator for freezers and refrigerators or a heat insulator for feed water heaters and pipeline cladding, among other applications.

EXAMPLES

The following examples and comparison examples are intended to describe this invention in further detail and should by no means be construed as defining the scope of the invention. In the examples, all parts are by weight.

The following polyols were used in the Examples and Comparison Examples.

Polyol A: a glycerol type polyether polyol with an OH value of 34.

Polyol B: an aromatic polyether polyol with an OH value of 450.

Polyol C: a sugar glycerol type polyether polyol with an OH value of 450.

Polyol D: an ethylenediamine type polyether polyol with an OH value of 400.

The various abbreviations used hereinafter have the following meanings.

CT: The cream time (in seconds) from initiation of mixing to the beginning of rise of the reaction.

GT: The gel time (in seconds) from initiation of mixing to the beginning of gelling due to increased viscosity.

DPG: dipropylene glycol

B-8017: a silicone type foam stabilizer available from Gold-Schumidt

SH-193: a silicone type foam stabilizer available from Toray Dow Corning

TE-30: tetramethylhexamethylenediamine (TMHDA)/bis(2-dimethylamino) ethyl ether (70/30) catalyst No. 1: tetramethylhexamethylenediamine (TMHDA; Kaolyzer No. 1, Toyocat MR)

Millionate MR-200: polymethylenepolyphenylene polyisocyanate; Nippon Polyurethane Sumidur 44V-10: polymethylenepolyphenylene poly isocyanate; Sumitomo Bayer Urethane The physical properties of foams were determined by the following methods.

Thermoformability: Each foam was heated to about 200C, compressed to 50% thickness using a cold press, cooled and removed from the mold. The foam showing a dimensional change not exceeding 1% was regarded as Good.

Cell size: The foam was cut on the day after free blowing and the major and minor diameters of cells were measured on an electron micrograph and averaged.

Compressive strength: The strength at 10% compression was measured in the direction of rise (P) and the direction perpendicular thereto (V). For any foam with a free foam density of not more than 30 kg/m³, the compressive strength of the foam compressed 50% after thermoforming was determined.

Dimensional stability: The dimensional change of the foam prior to thermoforming and that after thermoforming were respectively evaluated by measuring the change after 24 hours at −30° C. and 24 hours at 80° C. The foam showing a dimensional change not exceeding 1% was regarded as Good.

Glass transition temperature: The temperature at which tan δ (=E"/E') is maximal on the temperature-viscoelasticity chart of a high polymer material, where E' is the storage modulus and E" is the loss modulus.

Insulator moldability: On the day after free blowing, the foam was cut in parallel with the direction of blowing, heated to about 200° C., compressed 50% with a cold press, cooled and removed from the mold. The resulting iorm was heated at 120° C. for about 2 hours to remove the absorbed water and unreacted material and enclosed in a metal-plastic laminate film made up of an aluminum-metalizing polyester film and polyethylene film. The interior of the enclosure was evacuated to 0.05 mmHg and hermetically sealed to provide a heat insulator. With the thickness of the 50% compressed foam plus metal-plastic laminate film being taken as a control dimension, the dimensional change after insulator fabrication was calculated and the specimen showing a change within the range of 0–1% was rated Good.

Thermal conductivity: Using a K-Matic (Shinku Riko K.K.), the thermal conductivity of the heat insulator obtained was measured at a mean temperature of 24° C. As to Comparison Examples, heat insulators were similarly fabricated without thermoforming and their thermal conductivities were measured.

Example 1

The charge according to the blowing formula shown in Table 1 was set at a temperature of 251° C. and using a high-pressure urethane foaming machine, free blowing was carried out to provide an open cell rigid polyurethane foam. The foam was allowed to stand for a day and, then, cut in parallel with the direction of rise. Each specimen was heated to about 200° C., compressed 50% with a cold press, cooled and removed from the mold. The resulting foam was heated at 120° C. for about 2 hours to remove the adsorbed water and unreacted material and enclosed in an aluminum-metalizing polyesterpolyethylene laminate film. The interior of the enclosure was evacuated to 0.05 mmHg, followed by hermetic sealing to provide a heat insulator.

Examples 2–7 and Comparison Examples 1–5

According to the blowing formulas shown in Table 1, free blowing was carried out using a high-pressure urethane foaming machine. After thermoforming, there were obtained heat insulators. In Comparison Examples 1–5, free foams were prepared according to the formulas shown in Table 2.

TABLE 1

| | | Example | | | | | | |
|---|---|---|---|---|---|---|---|---|
| | | 1 | 2 | 3 | 4 | 5 | 6 | 7 |
| Polyol | | | | | | | | |
| Polyol A | | 20 | | | | | 40 | 30 |
| Polyol B | | 20 | | | | | | |
| Polyol C | | | 50 | 50 | 50 | 50 | | 50 |
| Polyol D | | 40 | 50 | 50 | 50 | 50 | 40 | 20 |
| DPG | | 20 | | | | | 20 | |
| Foam stabilizer | | | | | | | | |
| B-8017 | | 1.5 | | | | | | 1.5 |
| SH-193 | | | 1.5 | 1.5 | 1.5 | 1.5 | 1.5 | |
| Catalyst | | | | | | | | |
| TE-30 | | 0.1 | | | | | 0.1 | 0.2 |
| No.1 | | | 2.4 | 2.5 | 2.2 | 2.2 | | |
| Blowing agent | | | | | | | | |
| Water | | 6.5 | | | 1.0 | 1.0 | 2.5 | 4.0 |
| CFC-11 | | | 46 | | 33 | | | |
| HCFC-141b | | | | 42 | | 32 | | |
| Cell opening agent | | | | | | | | |
| Ca stearate | | | 0.8 | 0.8 | 0.8 | 0.8 | | |
| Sumidur 44V-10 | | 200 | | | | | 131 | 136 |
| Millionate MR-200 | | | 119 | 119 | 123 | 123 | | |
| (Isocyanate index) | | 100 | 110 | 110 | 100 | 100 | 110 | 100 |
| Reactivity | | | | | | | | |
| CT (sec.) | | 9 | 21 | 23 | 12 | 13 | 10 | 9 |
| GT (sec.) | | 54 | 60 | 61 | 60 | 60 | 62 | 58 |
| Physical properties | | | | | | | | |
| Density (kg/m³) | After thermoforming | 50 | 50 | 50 | 51 | 51 | 56 | 38 |
| Closed cell contents | After thermoforming | 2 | 2 | 3 | 1 | 2 | 0 | 0 |

TABLE 1-continued

| | | Example | | | | | | |
|---|---|---|---|---|---|---|---|---|
| | | 1 | 2 | 3 | 4 | 5 | 6 | 7 |
| (%) | | | | | | | | |
| Cell size (μm) | After thermoforming | 220 | 200 | 190 | 200 | 200 | 210 | 200 |
| Cell anisotropy ratio (P/V) | After thermoforming | 3.5 | 3.5 | 3.7 | 3.6 | 3.6 | 3.5 | 3.6 |
| Compressive strength (kg/cm²) | | | | | | | | |
| (P) | After thermoforming | 2.4 | 2.4 | 2.3 | 2.6 | 2.5 | 2.7 | 1.8 |
| (V) | After thermoforming | 1.3 | 1.2 | 1.2 | 1.4 | 1.3 | 1.5 | 1.0 |
| Dimensional stability | After thermoforming | Good | Good | Good | Good | Good | Good | Good |
| Glass transition temperature (°C.) | After thermoforming | 180 | 185 | 185 | 190 | 190 | 170 | 180 |
| Thermo-formability | After thermoforming | Good | Good | Good | Good | Good | Good | Good |
| Insulator moldability | After thermoforming | Good | Good | Good | Good | Good | Good | Good |
| Thermal conductivity (×10⁴ Kcal/mhr °C.) | After thermoforming | 50 | 50 | 50 | 50 | 50 | 50 | 50 |

TABLE 2

| | | Comparison Example | | | | |
|---|---|---|---|---|---|---|
| | | 1 | 2 | 3 | 4 | 5 |
| Polyol | | | | | | |
| Polyol A | | | 20 | 20 | | |
| Polyol B | | | 20 | 20 | | |
| Polyol C | | 50 | | | 50 | 50 |
| Polyol D | | 50 | 40 | 40 | 50 | 50 |
| DPG | | | 20 | 20 | | |
| From stabilizer | | | | | | |
| B-8017 | | | 1.5 | 1.5 | | |
| SH-193 | | 1.5 | | | 1.5 | 1.5 |
| Catalyst | | | | | | |
| TE-30 | | | 0.2 | 0.1 | | |
| No.1 | | 2.2 | | | 2.2 | 2.2 |
| Blowing agent | | | | | | |
| Water | | 1.0 | 2.0 | 6.5 | 1.0 | 1.0 |
| CFC-11 | | | | | 33 | |
| HCFC-141b | | 32 | | | | 32 |
| Cell opening agent | | | | | | |
| Ca stearate | | | | | 0.8 | 0.8 |
| Sumidur 44V-10 | | | 87 | 200 | | |
| Millionate MR-200 | | 123 | | | 123 | 123 |
| (Isocyanate index) | | 100 | 100 | 100 | 100 | 100 |
| Reactivity | | | | | | |
| CT (sec.) | | 13 | 10 | 9 | 13 | 12 |
| GT (sec.) | | 61 | 55 | 54 | 60 | 60 |
| Physical properties | | | | | | |
| Density (kg/m³) | Before thermoforming | 25 | 52 | 25 | 25 | 26 |
| Closed cell contents (%) | Before thermoforming | 88 | 3 | 3 | 2 | 2 |
| Cell size (μm) | Before thermoforming | 210 | 210 | 210 | 200 | 200 |
| Cell anisotropy ratio (P/V) | Before thermoforming | 1.6 | 1.4 | 1.5 | 1.6 | 1.6 |
| Compressive strength (kg/cm²) | | | | | | |
| (P) | Before thermoforming | 1.5 | 2.0 | 1.3 | 1.3 | 1.4 |
| (V) | Before thermoforming | 1.3 | 1.5 | 1.1 | 1.1 | 1.2 |
| Dimensional | Before thermoforming | Poor | Good | Good | Good | Good |

TABLE 2-continued

|  |  | Comparison Example | | | | |
|---|---|---|---|---|---|---|
|  |  | 1 | 2 | 3 | 4 | 5 |
| stability | | | | | | |
| Glass transition temperature (°C.) | Before thermoforming | 190 | 170 | 180 | 190 | 190 |
| Thermo-formability | Before thermoforming | Poor | Good | Good | Good | Good |
| Thermal conductivity (×10$^4$ Kcal/mhr °C.) | Before thermoforming | 150 | 90 | 80 | 80 | 80 |

The foam of Comparison Example 1 had a high closed cell rate so that it could not be thermoformed to the desired shape. In Comparison Examples 2–5, heat insulators were fabricated without thermoforming of open cell rigid polyurethane foams. As a consequence, their thermal conductivities were insufficient, $80\times10^{-4}$–$90\times10^{-4}$ kcal/mhr°C.

The heat insulator of this invention utilizing an open cell rigid polyurethane foam as the core has a high heat insulating property and can be applied freely to irregular installation surfaces.

We claim:

1. A method for producing a heat insulating material which comprises thermoforming an open cell rigid polyurethane foam obtained by reacting a polyol mixture and an organic polyisocyanate, enclosing the thermoformed foam in a gas barrier material, and evacuating the interior of the enclosure, said polyol mixture having a hydroxyl value of 160–500 mgKOH/g, and comprising:

a) 10–60% by weight of a polyoxyalkylene polyol having an average functionality of 2–3.5, a hydroxyl value of 26–90 mgKOH/g, an oxyethylene unit content of not more than 5% by weight based on whole polyoxyalkylene polyol and a primary hydroxyl group content of not more than 15% based on the total of hydroxyl groups of the whole polyoxyalkylene polyol;

(b) 20–80% by weight of a polyoxyalkylene polyol having an average functionality of 3–6, a hydroxyl value of 150–600 mgKOH/g, an oxyethylene unit content of not more than 5% by weight based on whole polyoxyalkylene polyol and a primary hydroxyl group content of not more than 15% based on the total of hydroxyl groups of the whole polyoxyalkylene polyol; and (c) 0–25% by weight of a polyoxyalkylene polyol having an average functionality of 2–3 and a hydroxyl value of over 600 mgKOH/g to 840 mgKOH/g, said organic polyisocyanate being a polymethylenepolyphenylene polyisocyanate, its prepolymer or a mixture thereof and wherein said thermoforming step produces at least a portion of the cells of the foam to have an anisotropic cell dimension.

2. The method as claimed in claim 1, wherein the foam is thermoformed at a temperature higher than the temperature at which the storage modulus of the open cell rigid polyurethane foam begins to decrease.

3. The method as claimed in claim 2, wherein the upper limit of the temperature for thermoforming is 250° C.

4. The method as claimed in claim 1, wherein the foam is produced by using water as substantially the sole blowing agent.

5. The method as claimed in claim 1, wherein the gas barrier material is a laminated film having a gas barrier layer and a thermoplastic layer.

6. The method as claimed in claim 1, wherein the cells of foam that are anisotropic have an anisotropy in the range of 3 to 5, as defined by the ratio of major diameter to minor diameter.

7. The method as claimed in claim 1, wherein said thermoforming comprises heating the open cell rigid polyurethane foam and applying a positive pressure to the heated foam so as to produce cells having an anisotropic cell dimension.

8. The method as claimed in claim 1, wherein said thermoforming comprises heating the open cell rigid polyurethane foam and subjecting the heated foam to a negative pressure in a cavity of a mold so as to conform the foam to the cavity of the mold.

9. The method as claimed in claim 1, wherein the heat insulating material has a thermal conductivity of about $50\times10^{-4}$ kcal/mhr°C.

* * * * *